US012682203B2

(12) United States Patent
    Kapil

(10) Patent No.:    US 12,682,203 B2

(45) **Date of Patent:    \*Jul. 14, 2026**

(54) ARTIFICIAL INTELLIGENCE CHAT BOT FOR CONFIGURING A DISTRIBUTED COMPUTING SYSTEM

(71) Applicant: Truist Bank, Charlotte, NC (US)

(72) Inventor: Narayan Kapil, Charlotte, NC (US)

(73) Assignee: Truist Bank, Charlotte, NC (US)

( \* ) Notice: Subject to any disclaimer, the term of this patent is extended or adjusted under 35 U.S.C. 154(b) by 225 days.

This patent is subject to a terminal disclaimer.

(21) Appl. No.: 18/497,483

(22) Filed: Oct. 30, 2023

(65) Prior Publication Data

US 2025/0139403 A1    May 1, 2025

Related U.S. Application Data

(63) Continuation of application No. 18/497,124, filed on Oct. 30, 2023.

(51) Int. Cl.
| | |
|---|---|
| *G06N 3/006* | (2023.01) |
| *G06F 9/451* | (2018.01) |
| *G06N 3/045* | (2023.01) |
| *G06N 3/08* | (2023.01) |
| *H04L 41/08* | (2022.01) |
| *H04L 41/16* | (2022.01) |
| *H04L 41/22* | (2022.01) |

(52) U.S. Cl.
    CPC ............. *G06N 3/006* (2013.01); *G06F 9/451* (2018.02); *G06N 3/045* (2023.01); *G06N 3/08* (2013.01); *H04L 41/0886* (2013.01); *H04L 41/16* (2013.01); *H04L 41/22* (2013.01)

(58) Field of Classification Search
    None
    See application file for complete search history.

(56) References Cited

U.S. PATENT DOCUMENTS

| | | | |
|---|---|---|---|
| 12,009,974 B1 * | 6/2024 | Mada | H04L 47/83 |
| 12,373,893 B2 * | 7/2025 | Nguyen | G06F 18/285 |
| 2021/0081837 A1 * | 3/2021 | Polleri | G06F 8/30 |
| 2021/0295036 A1 * | 9/2021 | Agarwal | G06F 40/56 |
| 2024/0256311 A1 * | 8/2024 | Bent, III | G06F 9/453 |

\* cited by examiner

*Primary Examiner* — Mohamed Ibrahim

(74) *Attorney, Agent, or Firm* — Kilpatrick Townsend & Stockton LLP; Michael A. Springs, Esq.

(57)    ABSTRACT

An artificial intelligence chat bot can be used to configure a cloud computing system. For example, a system can determine, using a first machine learning model, a target functionality for a distributed computing system based on an input provided by a user in a natural language format expressing the target functionality. The system can determine, using a second machine learning model, a recommended adjustment to an existing confirmation of the distributed computing system based on an incompatibility between the target functionality and a configuration setting of a software service executed by the distributed computing system. The system can output a response to the natural language input comprising the recommendation to the user in the natural language format. The system can automatically deploy or reconfigure the distributed computing system on the recommendation.

20 Claims, 4 Drawing Sheets

400

---

402
Determine, using a first machine learning model, a first selection by a user of a first parameter for configuring a distributed computing system based on a first input received via a graphical user interface in a natural language format

↓

404
Determine, using a second machine learning model and based on the first selection of the first parameter, an additional set of parameters usable to configure the distributed computing system

↓

406
Output, via the graphical user interface, a response comprising the additional set of parameters to the user in the natural language format

↓

408
Determine, using the first machine learning model, a second selection of a second parameter of the additional set of parameters based on a second input from the user received via the graphical user interface in the natural language format

↓

410
Automatically deploy the distributed computing system configured with the first parameter and the second parameter

ARTIFICIAL INTELLIGENCE CHAT BOT FOR CONFIGURING A DISTRIBUTED COMPUTING SYSTEM

CROSS REFERENCE TO RELATED APPLICATIONS

The present application is a continuation of U.S. patent application Ser. No. 18/497,124, filed Oct. 30, 2023 and titled "ARTIFICIAL INTELLIGENCE CHAT BOT FOR CONFIGURING A DISTRIBUTED COMPUTING SYSTEM," which is incorporated herein by reference.

TECHNICAL FIELD

The present disclosure relates generally to distributed computing systems and, more particularly (although not necessarily exclusively), an artificial intelligence chat bot for configuring distributed computing systems.

BACKGROUND

Distributed computing systems (e.g., cloud computing systems, data grids, and computing clusters) have recently grown in popularity given their ability to improve flexibility, responsiveness, and speed over conventional computing systems. These distributed computing systems may include dozens or hundreds of nodes interconnected via one or more networks. The nodes can be physical machines or virtual machines executing software processes, such as microservices, serverless functions, and applications. The nodes can execute the software processes to service various types of computer workloads ("workloads"), such as video conferencing, web surfing, voice communications, and data processing workloads.

BRIEF DESCRIPTION OF THE DRAWINGS

FIG. 4 is a flow chart of an example of a process for using an artificial intelligence chat bot to configure a distributed computing system, according to some aspects of the present disclosure.

DETAILED DESCRIPTION

Figure 1:
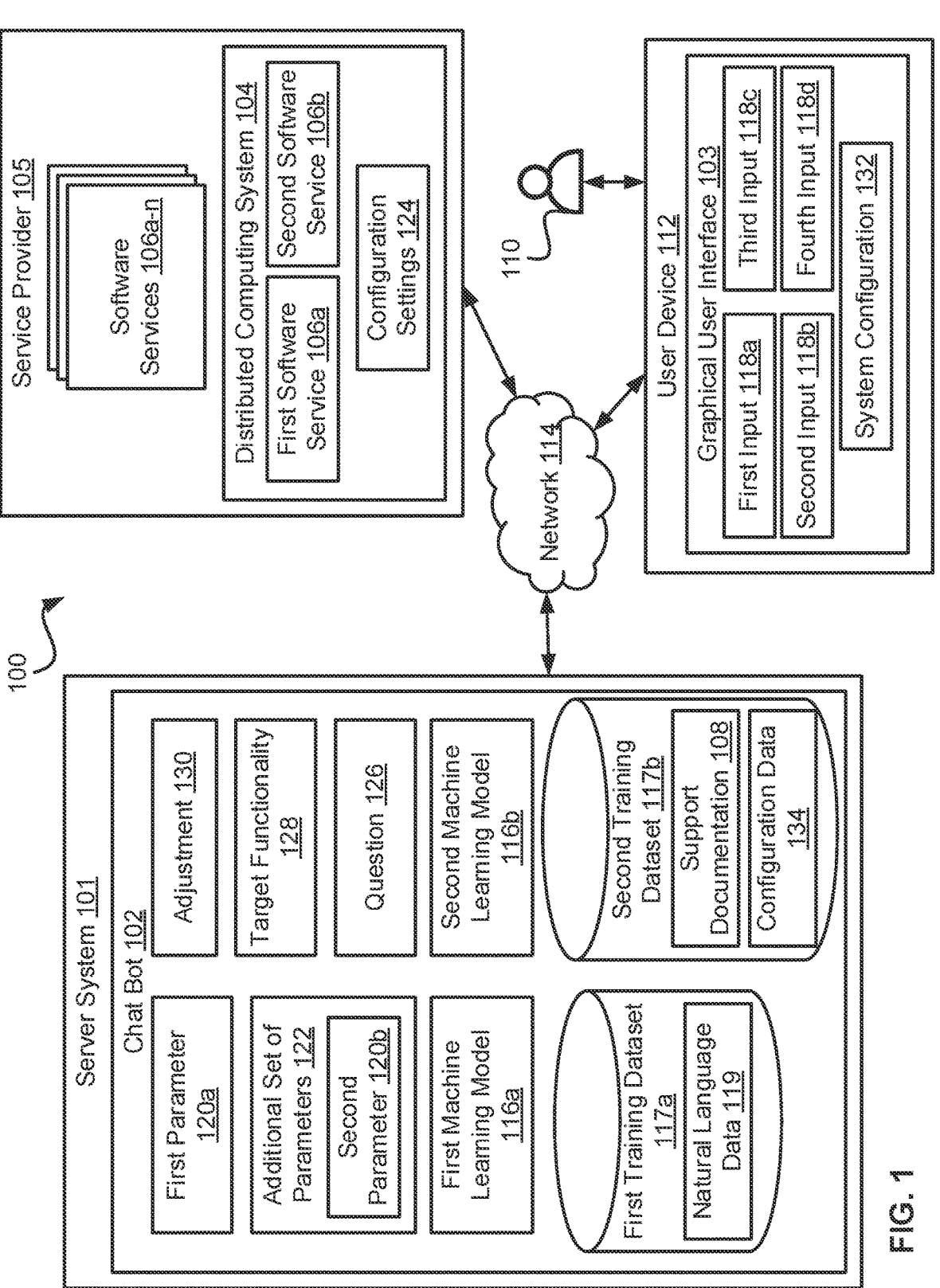
FIG. 1 is a block diagram of an example of a system with an artificial intelligence chat bot for configuring a distributed computing system, according to some aspects of the present disclosure.

Certain aspects and examples of the present disclosure relate to an artificial intelligence (AI) chat bot that can assist in generating and deploying a distributed computing system, such as a cloud computing system. The chat bot may interact with a user and guide the user through the process of selecting parameters for the distributed computing system. For example, the user may input a desired goal or functionality, or an initial selection of parameters, for a distributed computing system into the chat bot, which can be interpreted by the chat bot using natural language processing. The chat bot may include one or more machine learning models that have been trained on various datasets, such as support documentation for software services in the distributed computing system. The user input can be provided to the machine learning model, which can output options of parameters for the distributed computing system. The chat bot can present the parameters to the user in a natural language format. Each user selection of a parameter or further input provided by the user can constrain subsequent parameters presented by the chat bot in the natural language format. After the parameters have been selected, the chat bot can automatically deploy the distributed computing system according to the selected parameters.

Using conventional approaches, it can be challenging to build distributed computing systems. For example, service providers such as Amazon Web Services® (AWS) may offer hundreds of software services and tools for a distributed computing system. Each of these software services may require careful selection and configuration to deploy a distributed computing system that functions properly and in accordance with the user's goals. There can also be additional complexity in this process because the selection of one software service may affect the configuration of another software service, which can further complicate generation of the distributed computing system. The large numbers of software options, parameter configurations, and complex interactions between software services can make it difficult for a user to determine which software services to select and how to appropriately configure them to achieve their goals. While a service provider or other entities may offer support documentation such as articles, modules, and tutorials for configuring the software services, it may be time consuming and difficult to locate a key piece of information, which may be spread out across the Internet or buried among thousands of pages of documentation. Further, users that are less familiar with the relevant terminology and technology may struggle to identify or configure software services that meet their goals.

Some examples described herein can address one or more of the abovementioned problems using the AI chat bot, which leverages a machine learning model that can be trained using support documentation and other sources of information (e.g., blog posts, websites, forums, video clips, academic papers, books, etc.), to assist in developing a distributed computing system. The machine learning model can use inputs from the user to narrow down which software services to use and determine how the software services can be configured. The chat bot can interact with the user using natural language to guide the user through the process of configuring a cloud computing system or other kind of distributed computing system. This can allow users with any level of computing knowledge to successfully set up and deploy distributed computing systems that can perform target functionalities. Because of the machine learning model's training, the chat bot may also answer questions posed by the user about configuring the cloud computing system. And, the chat bot may identify issues that may be preventing the distributed computing system from functioning as intended, as well as generate recommendations for addressing the issues.

In some examples, the chat bot can be used to provide recommendations for a distributed computing system. For example, a user may be attempting to build a cloud computing system that has an unknown issue preventing successful deployment. The user can provide input to the chat bot explaining the target functionality for the cloud computing system, such as developing a web server that can host a certain number of people per month. The chat bot can provide the user's input, as well as the existing configuration of the cloud computing system, into the machine learning model. In response, the machine learning model can generate recommendations for adjustments to the configuration of the cloud computing system. The adjustments may involve modifying a configuration setting of a particular service, swapping out a software service for a more suitable software service, or any other modification to the configuration. Enabling the adjustment may allow the cloud computing system to successfully deploy and perform the target functionality.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 with an artificial intelligence chat bot 102 for configuring a distributed computing system 104, according to some aspects of the present disclosure. The chat bot 102 can be executed by a server system 101 running a first machine learning model 116a and a second machine learning model 116b with a corresponding graphical user interface 103 provided to a user device 112. A user 110 can use the graphical user interface 103 to interact with the chat bot 102 to generate a distributed computing system 104 using software services 106a-n provided by a service provider 105.

The service provider 105, server system 101, and user device 112 can communicate via a network 114. The network 114 can be a public data network, a private data network, or some combination thereof. A data network may include one or more of a variety of different types of networks, including a wireless network, a wired network, or a combination of a wired and a wireless network. Examples of suitable networks include the Internet, a personal area network, a local area network (LAN), a wide area network (WAN), or a wireless local area network (WLAN).

The chat bot 102 may include a first machine learning model 116a that can perform natural language processing (NLP). NLP is a subfield of machine learning and computer science that involves an interaction between computers and humans using human languages. An objective of NLP can be to extract meaning and understanding from content of human communication in text and speech. NLP can be used to automate a process based on what a person says. The server system 101 can train the first machine learning model 116a with a first training dataset 117a that includes natural language data 119a. The natural language data 119a may include any suitable textual content, such as content from blog posts, books, academic papers, social media, websites, and the like. The first machine learning model 116a can use the natural language data 119 during a training process to learn how to interpret natural language inputs and provide natural language responses to engage in a conversation with the user 110 to understand the target functionalities of the distributed computing system 104 sought by the user 110. The first machine learning model 116a may be any suitable type of NLP model. For example, the first machine learning model 116a may be a neural network, such as a generative pre-trained transformer (GPT) model.

The chat bot 102 can also include a second machine learning model 116b that is trained using support documentation 108 for the software services 106a-n. The support documentation 108 can include articles, modules, tutorials, or any other content that describes or teaches how to use the software services 106a-n. The second machine learning model 116b may include one or more deep neural networks. For example, the second machine learning model 116b may include a recurrent neural network, a transformer model, a generative adversarial network, or a combination thereof. The server system 101 can train the second machine learning model 116b using the second training dataset 117b that includes the support documentation 108. The second training dataset 117b may also include any other information related to the software services 106a-n, such as subscription models for the software services 106a-n. In some examples, the second machine learning model 116b may undergo multiple training phases, such as an unsupervised learning phase, a supervised learning phase, and a reinforcement learning phase. One example of the service provider 105 can be Amazon Web Services (AWS), which can provide software services related to networking, storage, middleware, and other software tools. The second machine learning model 116b may be trained on support documentation 108 for AWS such that the second machine learning model 116b can identify compatible combinations of software services 106 and configuration settings 124.

In some examples, the chat bot 102 may be provided by the service provider 105 as a tool for assisting the user 110 in generating the distributed computing system 104. The chat bot 102 can assist in generating or troubleshooting the distributed computing system 104 using NLP. After the chat bot 102 guides the user 110 through determining a combination of software services 106a-n and configuration settings for the distributed computing system 104, the chat bot 102 can automatically deploy the distributed computing system 104 on servers for the service provider 105.

For example, the user 110 may provide a first input 118a to the graphical user interface 103 provided by the chat bot 102 to the user device 112. The first input 118a may be a phrase in a natural language format requesting assistance with generating the distributed computing system 104 (e.g., "I'd like to use EKS to set up a computing cluster that I can export to Terraform"). The first input 118a can be provided as input to the first machine learning model 116a, which can generate an output indicating that the user has selected a first parameter 120a for the distributed computing system 104. The first parameter 120a can be the Amazon Elastic Kubernetes Service (EKS). The output from the first machine learning model 116a can be provided as input to the second machine learning model 116b, which can generate an output that includes additional selections of parameters based on the first parameter 120a. For example, the output may include software services that are used to generate or are compatible with software services that are used to generate computing clusters that can be exported to Terraform. Selecting these parameters may constrain subsequent options for configuring the distributed computing system 104. For example, selecting EKS may constrain the distributed computing system 104 to software services 106 that are compatible with Kubernetes.

The chat bot 102 can generate a response to the user 110 that presents the additional set of parameters 122 in a natural language format using the first machine learning model 116a. For example, the output from the second machine learning model 116b (e.g., the additional set of parameters 122) can be inputted into the first machine learning model 116a, which can generate a textual response in the natural language format that recommends the additional set of parameters 122. The first machine learning model 116a can be trained to generate natural language responses. In some examples, the response may involve asking the user 110 to choose from a list of additional software services 106*a*-*n* or configuration settings 124. The chat bot 102 can output the response to the graphical user interface 103 displayed on the user device 112. The user 110 can then provide a second input 118*b* to the chat bot 102 via the graphical user interface 103 on the user device 112. The second input 118*b* may be a selection of one of the additional set of parameters 122 in the natural language format. The chat bot 102 can provide the second input 118*b* into the first machine learning model 116*a*, which can generate an output indicating a second selection of a second parameter 120*b* from the additional set of parameters 122. For example, the user 110 may have selected a second parameter 120*b* of a second software service 106*b* that is a network load balancer.

The above process can repeat, with back-and-forth interactions between the user 110 and the chat bot 102 to conduct a conversation that helps the chat bot 102 understand the needs of the user 110 and define the parameters of a distributed computing system 104 that satisfies those needs. The chat bot 102 can continue interacting with the user 110 via the user device 112 using natural language until a stopping condition is met, for example if the chat bot 102 has obtained a suitable amount of information to generate the distributed computing system 104, or if the user indicates that they are satisfied.

In some examples, the user 110 may also input questions into the graphical user interface 103 provided by the chat bot 102 to the user device 112. The chat bot 102 can use the first machine learning model 116*a* and the second machine learning model 116*b* to interpret the questions and to generate responses based on the support documentation 108. This can be particularly helpful for a user 110 that is not familiar with the software services 106*a*-*n* provided by the service provider 105.

After the distributed computing system 104 has been configured (e.g., with the first software service 106*a*, the second software service 106*b*, and any configuration settings 124), the chat bot 102 can automatically deploy the distributed computing system 104. For example, the chat bot 102 may ask the user 110 if they wish to deploy the distributed computing system 104 and, upon receiving their affirmative response, interact with the service provider 105 to deploy a distributed computing system 104 with the determined configuration. For instance, the chat bot 102 can issue the appropriate commands to the service provider's application programming interface (API) to deploy a distributed computing system 104 with the determined configuration. The assistance of the chat bot 102 can allow distributed computing systems 104 to be quickly and efficiently generated and deployed.

In some examples, the chat bot 102 can also be used to assist in troubleshooting a system configuration 132 of a distributed computing system 104 by generating recommendations of adjustments. To generate recommendations of adjustments, the server system 101 may train the second machine learning model 116*b* using additional training data in the second training dataset 117*b* such as configuration data 134. The configuration data 134 can include historical data of system configurations and adjustments that can improve or fix issues with the system configurations. The user 110 may provide a third input 118*c* to the graphical user interface 103 provided by the chat bot 102 to the user device 112 that includes a request for assistance with the distributed computing system 104. For example, the third input 118*c* may be the phrase "Why is my network load balancer not working?" In some examples, the request may also include a system configuration 132 of the distributed computing system 104 (e.g., log files, configuration files, or any other information regarding the state of the distributed computing system 104). In other examples where the chat bot 102 is provided by the service provider 105 to assist users with configuring distributed computing systems 104, the chat bot 102 may automatically access the system configuration 132.

The chat bot 102 can provide the third input 118*c* as input to the first machine learning model 116*a*, which can generate an output that identifies a target functionality 128 that is desired by the user 110. For example, the target functionality 128 may be a functioning load balancer. The current system configuration 132 of the distributed computing system 104 and the target functionality 128 output by the first machine learning model 116*a* can be input into the second machine learning model 116*b*, which can generate an output including a recommendation for an adjustment 130 to the system configuration 132 of the distributed computing system 104 in response. In this example, the recommendation may involve adjusting a configuration setting 124 for a private subnet in the distributed computing system 104 to be compatible with the network load balancer, thus causing the network load balancer to function properly and match the target functionality 128. The chat bot 102 can output the recommendation for the adjustment 130 to the user device 112. If the user 110 selects the recommendation, the chat bot 102 can automatically update the system configuration 132 of the distributed computing system 104 according to the adjustment 130. For example, the chat bot 102 may send a command to an appropriate API for the service provider 105 to update the configuration setting 124.

In some examples, the chat bot 102 may determine selections of parameters by asking the user 110 for additional details, or by asking the user 110 a question 126 that can be interpreted to further configure the distributed computing system 104. The question 126 may be about the user's requirements or the intended functionality of the distributed computing system 104. For example, the question 126 may be the phrase "How many containers are required for your cloud computing system?" Other examples of questions may request information on level of experience with various types of software, cost limits, processing power requirements, or any other information that may be used to select or narrow down parameters for configuring the distributed computing system 104. The question 126 may be generated based on previous selections made by the user 110.

The chat bot 102 can output the question 126 to the user device 112 via the graphical user interface 103 in the natural language format. The user 110 may provide a fourth input 118*d* to the chat bot 102 via the graphical user interface 103 responding to the question 126. For example, the fourth input 118*d* may state "I need up to ten containers." The chat bot 102 can provide the fourth input 118*d* as input to the first machine learning model 116*a* to generate an output that indicates the meaning of the response. The output can be provided as input to the second machine learning model 116*b*, which can generate an output that indicates a parameter. For example, the chat bot 102 can determine configuration settings 124 that can enable hosting the number of containers required for the distributed computing system 104.

Although FIG. 1 depicts a certain number and arrangement of components, this is for illustrative purposes and is intended to be non-limiting. Other examples may include more components, fewer components, different components, or a different arrangement of the components shown in FIG.

1. For example, two software services 106a-b are depicted in the distributed computing system 104 in in FIG. 1, but any number of services may be included.

Figure 2:
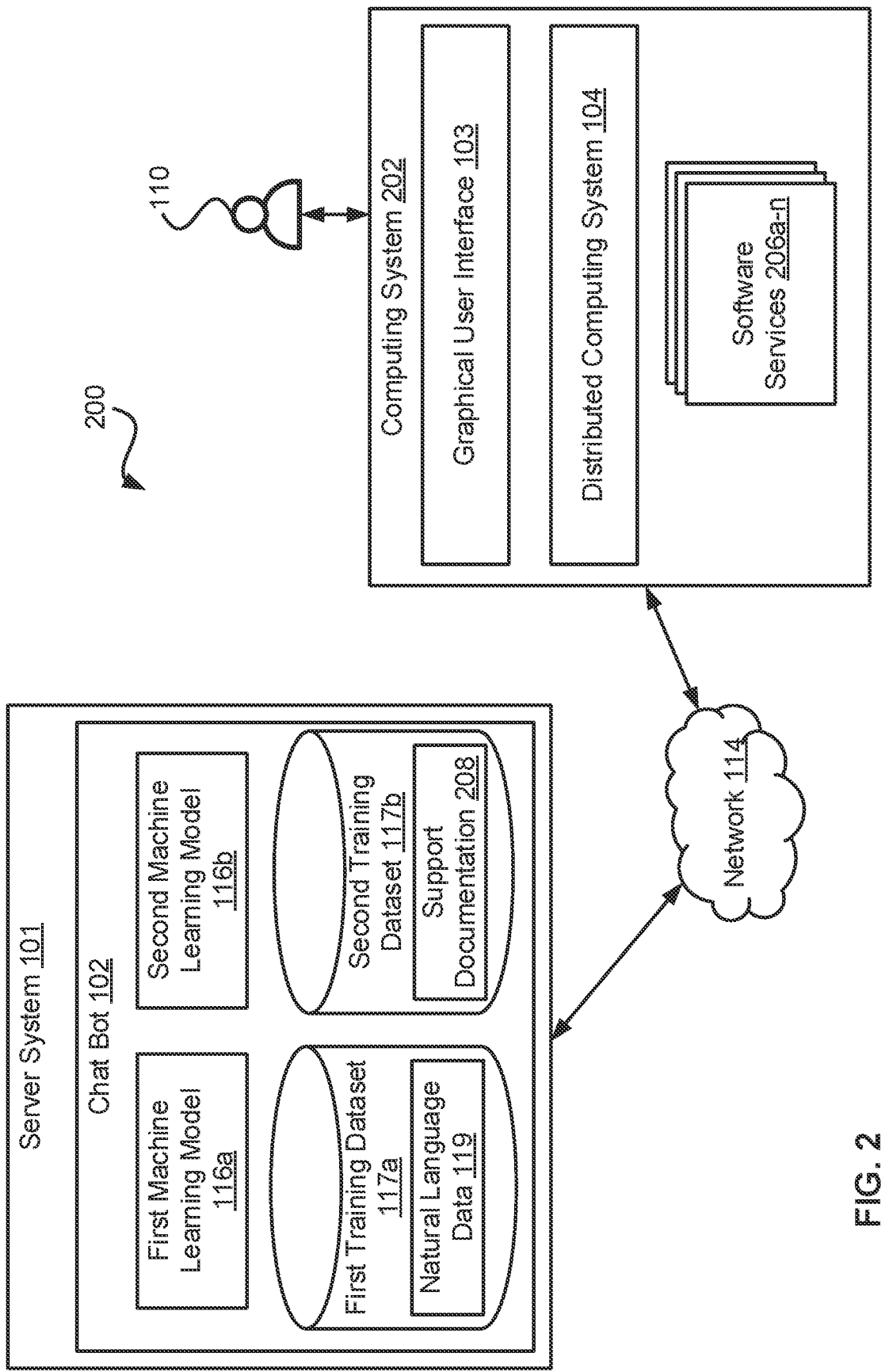
FIG. 2 is a block diagram of another example of a system with an artificial intelligence chat bot for configuring a distributed computing system, according to some aspects of the present disclosure.

FIG. 2 is a block diagram of another example of a system 200 with an artificial intelligence chat bot 102 for configuring a distributed computing system 104, according to some aspects of the present disclosure. Similar to the system 100, the system 200 may include a server system 101 with a chat bot 102 that includes a first machine learning model 116a and a second machine learning model 116b. The chat bot 102 can interact with a user 110 to provide assistance in configuring a distributed computing system 104. The system 200 may differ from the system 100 in that the server system 101 may assist the user 110 in deploying a distributed computing system 104 on a computing system 202 associated with the user 110, rather than on servers associated with a remote service provider that provides software services. The distributed computing system 104 may be configured with software services 206a-n that are executed by the computing system 202 itself, rather than by accessing software services hosted by another entity (e.g., the service provider 105 of FIG. 1). Because of this, the second machine learning model 116b can be trained with a second training dataset 117b that can include support documentation 208 for the software services 206a-n hosted by the computing system 202. The second training dataset 117b may also include any specification details for the computing system 202, such as processing power, storage, or any other characteristics of the computing system 202.

Similar to FIG. 1, the chat bot 102 may include a first machine learning model 116a trained with a first training dataset 117a that includes natural language data 119. The server system 101 can provide a graphical user interface 103 to the computing system 202. The user 110 can interact with the graphical user interface 103 to provide inputs to the chat bot 102 and receive outputs that can guide the user 110 through the process of deploying the distributed computing system 104 on the computing system 202. When the user 110 indicates that the distributed computing system 104 is ready for deployment, the server system 101 can automatically deploy the distributed computing system 104 on the computing system 202 according to parameters selected by the user 110 interacting with the chat bot 102. Because the distributed computing system 104 is deployed on the computing system 202 associated with the user 110, the server system 101 may issue API calls to the computing system 202 to automatically deploy the distributed computing system 104.

Figure 3:
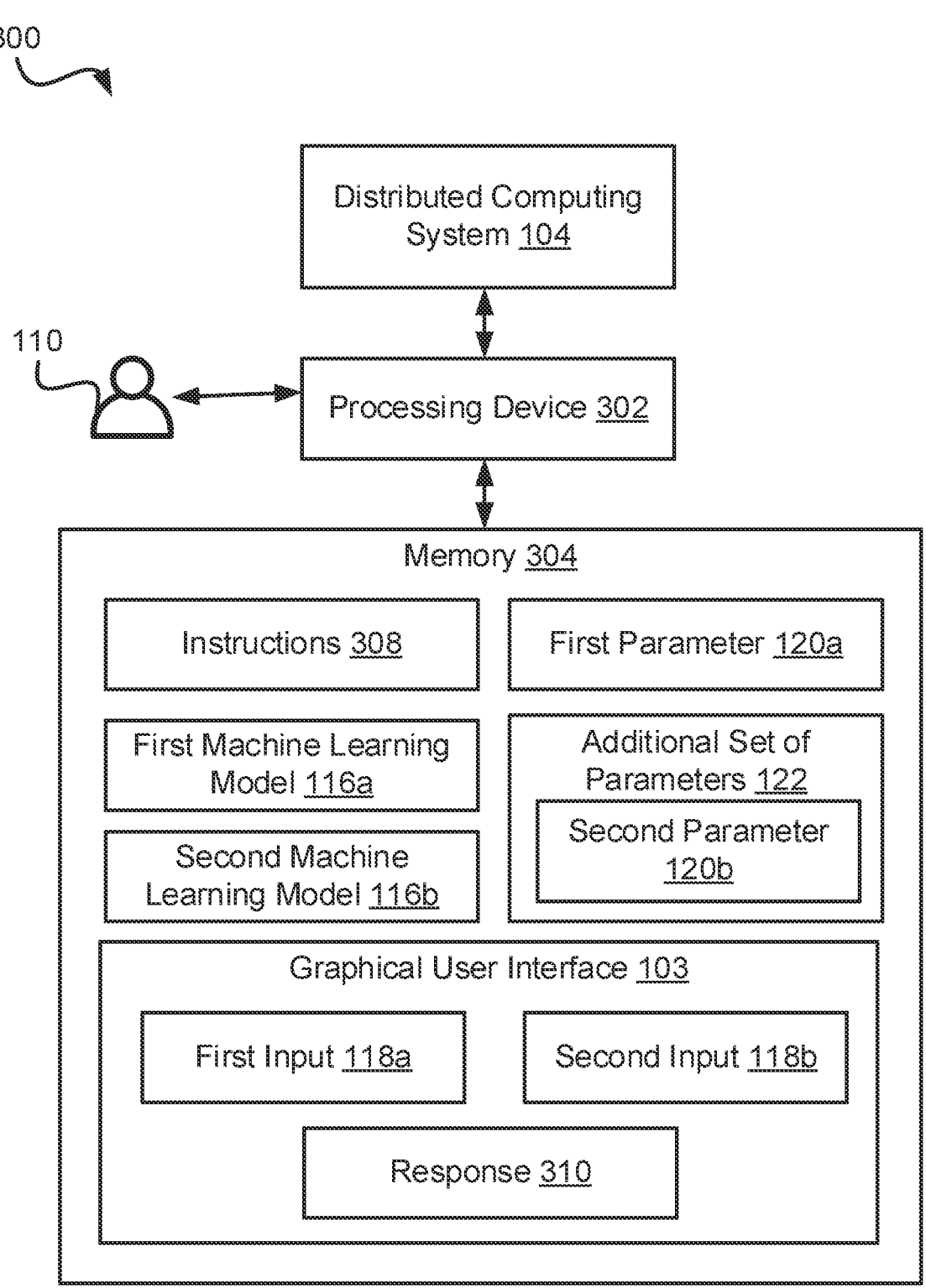
FIG. 3 is a block diagram of an example of a system for configuring a distributed computing system, according to some aspects of the present disclosure.

FIG. 3 is a block diagram of an example computing device 300 according to some aspects of the present disclosure. The computing device 300 includes a processing device 302 that is communicatively coupled to a memory 204. In some examples, the processing device 302 and the memory 304 may be distributed from (e.g., remote to) one another.

The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions 306 stored in the memory 304 to perform operations. In some examples, the instructions 306 can include processor-specific instructions generated by a compiler or an interpreter from code written in a suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory, computer-readable medium from which the processing device 302 can read instructions 306. A computer-readable medium can include electronic, optical, magnetic, or other storage devices capable of providing the processing device 302 with computer-readable instructions or other program codes. Non-limiting examples of a computer-readable medium include magnetic disk(s), memory chip(s), ROM, random-access memory (RAM), an ASIC, a configured processor, optical storage, or any other medium from which a computer processor can read the instructions 306.

The memory 304 can include a graphical user interface 103 that a user 110 can interact with to configure a distributed computing system 104. The memory 304 may further include a first machine learning model 116a that is trained to perform natural language processing, such as by using the first training dataset 117a of natural language data 119 of FIG. 1. The memory 304 also includes a second machine learning model 116b that can be trained with historical data including support documentation 108 for software services 106a-n. The first machine learning model 116a and the second machine learning model 116b can be used to determine selections of parameters based on inputs from a user 110 that were provided in a natural language format via the graphical user interface 103. The first machine learning model 116a can use natural language processing to identify a first parameter 120a (e.g., a software service) the user 110 has requested from the input. The second machine learning model 116b can also identify additional set of parameters 122 that can be used to configure the distributed computing system 104 based on the selected first parameter 120a. The additional set of parameters 122 can be additional services or configuration settings that can be combined with the first parameter 120a. The processing device 302 can output the additional set of parameters 122 for display to the user 110 via the graphical user interface 103. After determining a second selection of a second parameter 120b by the user 110 from among the additional set of parameters 122 based on a second input 118b provided in the natural language format, the processing device 302 can automatically deploy the distributed computing system 104 configured according to the first parameter 120a and the second parameter 120b.

Turning now to FIG. 4, shown is a flow chart of an example of a process 400 for using an artificial intelligence chat bot to configure a distributed computing system, according to some aspects of the present disclosure. Other examples can involve more operations, fewer operations, different operations, or a different order of operations shown in the figures. The operations of FIG. 4 will now be described below with reference to the components described above in FIGS. 1-3. Some or all of the steps of the process 400 can be performed by the processing device 302.

At block 402, the process 400 involves determining, using a first machine learning model 116a, a first selection by a user 110 of a first parameter 120a for configuring a distributed computing system 104 based on a first input 118a received via a graphical user interface 103 in a natural language format. The first machine learning model 116a may be part of a chat bot 102 that can interact with the user 110 to provide assistance. The first machine learning model 116a can perform natural language processing to interpret the first input 118a and identify the intent. For example, the first input 118a may involve the user 110 requesting assistance with setting up a computing cluster that hosts containerized applications using Amazon Elastic Kubernetes Service (EKS). The processing device 302 can provide the first input 118a as input to the first machine learning model 116a, which can generate an output indicating that the user 110 has selected a distributed computing system 104 that utilizes EKS, which can be the first parameter 120a.

At block 404, the process 400 involves determining, using a second machine learning model 116b and based on the first selection of the first parameter 120a, an additional set of parameters 122 usable to configure the distributed computing system 104. The additional set of parameters 122 may be constrained to additional software services 106 or configuration settings 124 that are compatible with the first parameter 120a. For example, because the first parameter 120a was selected to be using EKS and provided as input to the second machine learning model 116, the second machine learning model 116b may generate an output that includes an additional set of parameters 122 comprising a choice between using Amazon Managed Node Group or Amazon Fargate with EKS in the distributed computing system 104.

At block 406, the process 400 involves outputting, by the processing device 302 and via the graphical user interface 103, the additional set of parameters 122 to the user 110 in the natural language format. The processing device 302 may input the additional set of parameters 122 into the first machine learning model 116a, which can generate an output of a response 310 to the user 110 that presents the additional set of parameters 122 in the natural language format. For example, the first machine learning model 116a may generate a response 310 that states: "Please choose between using Amazon Managed Node Group or Amazon Fargate to run containers." In some examples, the response 310 may additionally provide information on both services to the user 110 with or without further prompting. The additional information may include a comparison of benefits or drawbacks of using either service.

At block 408, the process 400 involves determining, using the first machine learning model 116a, a second selection of a second parameter 120b of the additional set of parameters 122 based on a second input 118b from the user 110 received via the graphical user interface 103 in the natural language format. For example, the second input 118b may state: "Use Managed Node Group." The second input 118b can be provided as input to the first machine learning model 116a, which can generate an output indicating the second selection of the second parameter 120b (e.g., selecting Amazon Managed Node Group). This second selection may further constrain subsequent options for configuring the distributed computing system 104. For example, because the user 110 selected Amazon Managed Node Group, the processing device 302 may select Amazon Elastic Compute Cloud (EC2) instances for the distributed computing system 104. The chat bot 102 can continue to interact with the user 110 using natural language processing until a stopping condition is satisfied, such as the user 110 indicating that the distributed computing system 104 is ready for deployment.

At block 410, the process 400 involves automatically deploying the distributed computing system 104 configured with the first parameter 120a and the second parameter 120b. For example, if the chat bot 102 is hosted by the same service provider 105 that provides the software services 106a-n and can deploy the distributed computing system 104, the processing device 302 may transmit API calls to the service provider 105 to access and configure the appropriate software services 106 needed for the distributed computing system 104. In this example, the processing device 302 may generate and transmit API calls to services including EKS and Amazon Managed Node Group. The processing device 302 may also generate and transmit an API call to request EC2 instances.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a non-transitory computer-readable memory comprising instructions that are executable by the processing device for causing the processing device to:
receive a natural language input from a user via a graphical user interface, the natural language input being in a natural language format and expressing a target functionality for a distributed computing system;
provide the natural language input to a first machine learning model, the first machine learning model being configured to analyze the natural language input to ascertain the target functionality from the natural language input and to generate an output indicating the target functionality for the distributed computing system;
provide the target functionality and an existing configuration for the distributed computing system as input into a second machine learning model, the second machine learning model being configured to output a recommendation for an adjustment to the existing configuration of the distributed computing system based on an incompatibility between the target functionality and a configuration setting of a software service executed by the distributed computing system, wherein the adjustment comprises a modification to the configuration setting to enable the distributed computing system to perform the target functionality;
generate a response to the natural language input comprising the recommendation to the user in the natural language format; and
output, via the graphical user interface, the response to the user.

2. The system of claim 1, wherein the natural language input is a first input, the response is a first response, and wherein the memory further comprises instructions that are executable by the processing device for causing the processing device to:
receive a second input from the user via the graphical user interface, the second input being in the natural language format;
provide the second input to the first machine learning model, the first machine learning model being configured to output a first selection of a first parameter for configuring the distributed computing system;
provide the first parameter as input into the second machine learning model, the second machine learning model being configured to output an additional set of parameters usable to configure the distributed computing system; and provide the additional set of parameters as input to the first machine learning model, the first machine learning model being configured to output a second response to the second input comprising the additional set of parameters in the natural language format.

3. The system of claim 2, wherein the memory further comprises instructions that are executable by the processing device for causing the processing device to:

output, via the graphical user interface, the second response to the second input;

receive a third input from the user via the graphical user interface, the third input being in the natural language format;

provide the third input to the first machine learning model, the first machine learning model being configured to output a second selection of a second parameter of the additional set of parameters; and automatically deploy the distributed computing system configured with the first parameter and the second parameter.

4. The system of claim 3, wherein the memory further comprises instructions that are executable by the processing device for causing the processing device to:

provide a previous selection made by the user to the first machine learning model, the first machine learning model being configured to generate a question in the natural language format for the user;

output, via the graphical user interface, the question to the user in the natural language format;

receive a fourth input from the user via the graphical user interface, the fourth input being in the natural language format and comprising a response to the question; and provide the fourth input to the first machine learning model, the first machine learning model being configured to output the second selection of the second parameter of the additional set of parameters.

5. The system of claim 2, wherein the first parameter or the additional set of parameters comprise a particular software service provided by a service provider or a configuration setting for the particular software service.

6. The system of claim 1, wherein the memory further comprises instructions that are executable by the processing device for causing the processing device to:

train the first machine learning model with natural language data; and train the second machine learning model with support documentation for software services provided by a service provider.

7. The system of claim 1, wherein the memory further comprises instructions that are executable by the processing device for causing the processing device to:

receive the recommendation from the second machine learning model; and automatically perform the adjustment to the existing configuration of the distributed computing system by transmitting an application programming interface call to a service provider for the distributed computing system.

8. A method comprising:

receiving, by a processing device, a natural language input from a user via a graphical user interface, the natural language input being in a natural language format and expressing a target functionality for a distributed computing system;

providing, by the processing device, the natural language input to a first machine learning model, the first machine learning model being configured to analyze the natural language input to ascertain the target functionality from the natural language input and to generate an output indicating the target functionality for the distributed computing system;

providing, by the processing device, the target functionality and an existing configuration for the distributed computing system as input to a second machine learning model, the second machine learning model being configured to output a recommendation for an adjustment to the existing configuration of the distributed computing system based on an incompatibility between the target functionality and a configuration setting of a software service executed by the distributed computing system, wherein the adjustment comprises a modification to the configuration setting to enable the distributed computing system to perform the target functionality;

generating, by the processing device, a response to the natural language input comprising the recommendation to the user in the natural language format; and outputting, by the processing device and via the graphical user interface, the response to the user.

9. The method of claim 8, wherein the natural language input is a first input, the response is a first response, and wherein the method further comprises:

receiving a second input from the user via the graphical user interface, the second input being in the natural language format;

providing the second input to the first machine learning model, the first machine learning model being configured to output a first selection of a first parameter for configuring the distributed computing system;

providing the first parameter as input into the second machine learning model, the second machine learning model being configured to output an additional set of parameters usable to configure the distributed computing system; and providing the additional set of parameters as input to the first machine learning model, the first machine learning model being configured to output a second response to the second input comprising the additional set of parameters in the natural language format.

10. The method of claim 9, further comprising:

outputting, via the graphical user interface, the second response to the second input;

receiving a third input from the user via the graphical user interface, the third input being in the natural language format;

providing the third input to the first machine learning model, the first machine learning model being configured to output a second selection of a second parameter of the additional set of parameters; and automatically deploying the distributed computing system configured with the first parameter and the second parameter.

11. The method of claim 10, further comprising:

providing a previous selection made by the user to the first machine learning model, the first machine learning model being configured to generate a question in the natural language format for the user;

outputting, via the graphical user interface, the question to the user in the natural language format;

receiving a fourth input from the user via the graphical user interface, the fourth input being in the natural language format and comprising a response to the question; and providing the fourth input to the first machine learning
model, the first machine learning model being config-
ured to output the second selection of the second
parameter of the additional set of parameters.

12. The method of claim 9, wherein the first parameter or
the additional set of parameters comprise a particular soft-
ware service provided by a service provider or a configu-
ration setting for the particular software service.

13. The method of claim 8, further comprising:
training the first machine learning model with natural
language data; and
training the second machine learning model with support
documentation for software services provided by a
service provider.

14. The method of claim 8, further comprising:
receiving the recommendation from the second machine
learning model; and
automatically performing the adjustment to the existing
configuration of the distributed computing system by
transmitting an application programming interface call
to a service provider for the distributed computing
system.

15. A non-transitory computer-readable medium compris-
ing program code that is executable by a processing device
for causing the processing device to:
receive a natural language input from a user via a graphi-
cal user interface, the natural language input being in a
natural language format and expressing a target func-
tionality for a distributed computing system;
provide the natural language input to a first machine
learning model, the first machine learning model being
configured to analyze the natural language input to
ascertain the target functionality from the natural lan-
guage input and to generate an output indicating the
target functionality for the distributed computing sys-
tem;
provide the target functionality and an existing configu-
ration for the distributed computing system as input to
a second machine learning model, the second machine
learning model being configured to output a recom-
mendation for an adjustment to the existing configu-
ration of the distributed computing system based on an
incompatibility between the target functionality and a
configuration setting of a software service executed by
the distributed computing system, wherein the adjust-
ment comprises a modification to the configuration
setting to enable the distributed computing system to
perform the target functionality;
generate a response to the natural language input com-
prising the recommendation to the user in the natural
language format; and
output, via the graphical user interface, the response to the
user.

16. The non-transitory computer-readable medium of
claim 15, wherein the natural language input is a first input,
the response is a first response, and the non-transitory
computer-readable medium further comprises program code
that is executable by the processing device for causing the
processing device to:

receive a second input from the user via the graphical user
interface, the second input being in the natural lan-
guage format;
provide the second input to the first machine learning
model, the first machine learning model being config-
ured to output a first selection of a first parameter for
configuring the distributed computing system;
provide the first parameter as input into the second
machine learning model, the second machine learning
model being configured to output an additional set of
parameters usable to configure the distributed comput-
ing system; and
provide the additional set of parameters as input to the
first machine learning model, the first machine learning
model being configured to output a second response to
the second input comprising the additional set of
parameters in the natural language format.

17. The non-transitory computer-readable medium of
claim 16, wherein the first parameter or the additional set of
parameters comprise a particular software service provided
by a service provider or a configuration setting for the
particular software service.

18. The non-transitory computer-readable medium of
claim 16, wherein the program code is further executable by
the processing device for causing the processing device to:
output, via the graphical user interface, the second
response to the second input;
receive a third input from the user via the graphical user
interface, the third input being in the natural language
format;
provide the third input to the first machine learning model,
the first machine learning model being configured to
output a second selection of a second parameter of the
additional set of parameters; and
automatically deploy the distributed computing system
configured with the first parameter and the second
parameter.

19. The non-transitory computer-readable medium of
claim 15, wherein the program code is further executable by
the processing device for causing the processing device to:
train the first machine learning model with natural lan-
guage data; and
train the second machine learning model with support
documentation for software services provided by a
service provider.

20. The non-transitory computer-readable medium of
claim 15, wherein the program code is further executable by
the processing device for causing the processing device to:
receive the recommendation from the second machine
learning model; and
automatically perform the adjustment to the existing
configuration of the distributed computing system by
transmitting an application programming interface call
to a service provider for the distributed computing
system.

* * * * *